ated Apr. 8, 1969

3,437,294
ADJUSTING MECHANISM PRIMARILY
FOR EJECTION SEATS
James Martin, Southlands Manor, Southlands Road,
Denham, near Uxbridge, Middlesex, England
Filed Feb. 20, 1968, Ser. No. 706,864
Claims priority, application Great Britain, Mar. 8, 1967,
10,930/67
Int. Cl. B64d 25/04, 11/06
U.S. Cl. 244—122                    7 Claims

ABSTRACT OF THE DISCLOSURE

The invention concerns ejection seats with angularly movable rocket motor for assisting in the ejection sequence and in particular concerns an improved adjusting mechanism for moving angularly the rocket motor with respect to the seat to alter its thrust line direction, the mechanism comprising a telescopic assembly having one part threaded and engaging a pinion as a worm so that movement of one part is transmitted to a calibrated indicator drum.

---

This invention concerns vehicle ejection seats and, whilst this invention is particularly concerned with airman and aircraft ejection seats and will be described in relation thereto, the terms "aircraft ejection seat" and "airman" should be understood herein to embrace any vehicle ejection seat and its occupant where the context so admits.

In aircraft ejection seats successfully adapted in practice in the past ejection of the seat from the aircraft has been effected by means of an ejection gun alone or by means of an ejection gun in conjunction with a rocket motor. Ejection seats utilising rocket motors in conjunction with ejection guns are the subject of, for example my U.S. Patents Nos. 3,186,662 and 3,124,324 and my British Patents Nos. 959,897; 959,898 and 959,899.

In each of the specifications of the aforementioned patents it is stressed that it is important that the thrust line of the rocket motor should pass through, or substantially through, the centre of gravity of the seat/airman combination. Still further, in the specifications of certain of these aforementioned Patents, for example British Patents Nos. 959,897 and 959,898 ejection seas are described in which provision is made for adjusting the position of the thrust line of the rocket motor.

In the complete specification of my co-pending U.S. patent application No. 604,354 there is described and claimed an ejection seat for ejecting an airman from an aircraft comprising an ejecting gun for effecting initial ejection of the combination from the aircraft in a predetermined direction relative to the aircraft and at least one rocket motor pack positioned beneath the ejection seat, such rocket motor pack being pivotally mounted on said seat in such a manner as to permit angular movement of the pack adjusting means coupled to said rocket motor pack and to said ejection seat, such adjusting means being actuable to set the pack into a desired angular position significant of airman weight moments about a selected (arbitary) datum.

Furthermore, in such specification certain particular constructions of rocket motor pack adjusting means are described and claimed.

Whilst such specific constructions are generally satisfactory in operation efforts are being made continuously to provide the very best construction of adjusting means which may be rapidly and easily actuated by an airman to be seated in the seat and which will reliably ensure accurate setting of such pack with respect to such seat.

One object of the invention is therefore to provide an improved form of adjusting means particularly suitable for the ejection system referred to hereinbefore.

Thus, in accordance with one aspect of the invention there is provided an ejection seat for ejecting an airman from an aircraft comprising an ejection gun for effecting initial ejection of the seat/airman combination from the aircraft in a predetermined direction relative to the aircraft and at least one rocket motor pack positioned beneath the ejection seat, such rocket motor pack being pivotally mounted on said seat in such a manner as to permit angular movement of the pack, adjusting means coupled to said rocket motor pack and to said ejection seat, such adjusting means being actuable to set the pack into a desired angular position significant of airman weight moments about a selected (arbitary) datum, and such adjusting means comprising a linkage assembly extending between the seat and the pack and being arranged so that the effective length thereof may be varied, such linkage assembly comprising a tubular body housing a first screw-threaded member rotatable within such body about its longitudinal axis but being restrained against longitudinal axial movement, the screw thread of such first member engaging a screw-threaded portion of a second member of tubular form which lies at least partially within said body, this second member being restrained against rotational movement about its longitudinal axis, the arrangement being such that rotation of the first member results in axial movement of said second member, means being provided to rotate said first member and a pinion being provided on said body which is engaged by the screw thread of the first member or a separate screw thread thereon, this screw thread acting on said pinion as a worm, means being provided to transmit movement of said pinion in response to said rotary movement of the first member i.e. in response to movement of the worm to an indicator calibrated with graduations significant of airman weight moments about a selected (arbitary) datum.

According to one feature of the invention said indicator may comprise a rotatable drum and said means for transmitting movement of the pinion to the indicator may comprise a gear assembly arranged to transmit small movements of the pinion as larger movements to the drum.

Very conveniently said body may be secured to the ejection seat (desirably at a position where the means for rotating said first member may be operated by an airman seated in the ejection seat) whilst said axially movable second member is secured to the rocket motor pack.

Advantageously said means for rotating said first member may comprise a manually operable knob carried rigidly on said first member.

Advantageously one continuous screw thread may be provided on said first member, a portion of this thread engaging the screw thread of the second member and a portion engaging the pinion.

According to another aspect of this invention there is provided in or for an ejection system (for ejecting an ejection seat/airman combination from an aircraft comprising an ejection gun for effecting initial ejection of the combination from the aircraft in a predetermined direction relative to the aircraft and at least one rocket motor pack positioned beneath the ejection seat, such rocket motor pack being pivotally mounted on said seat in such a manner to permit angular movement thereof), adjusting means comprising a linkage assembly extending between the seat and the pack and being arranged so that the effective length thereof may be varied, such linkage assembly comprising a tubular body housing a first screw-threaded member rotatable within such body about its longitudinal axis but being restrained against longitudinal axial movement, the screw thread of such first member engaging a screw-threaded portion of a second member of tubular form which lies at least partially within said body, this second member being restrained against rotational movement about its longitudinal axis, the arrangement being such that rotation of the first member results in axial movement of said second member, means being provided to rotate said first member and a pinion being provided on said body which is engaged by the screw thread of the first member, or a separate thread thereon, this screw thread acting on said pinion as a worm, means being provided to transmit movement of said pinion in response to said rotary movement of the first member i.e. in response to movement of the worm to an indicator calibrated with graduations significant of airman weight moments about a selected (arbitary) datum.

In order that the invention may be more readily understood, and further features of the same more fully appreciated, one specific embodiment of adjusting means will now be described by way of example and with reference to the accompanying drawing in which.

Figure 1:
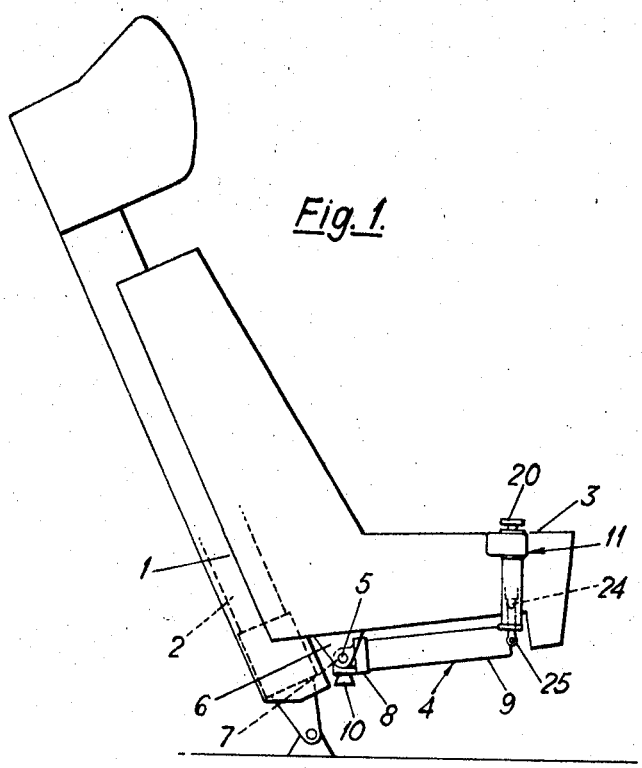
FIGURE 1 is a fragmentary side elevational view of an ejection seat provided with a rocket motor and adjusting means in accordance with this invention.
Figure 3:
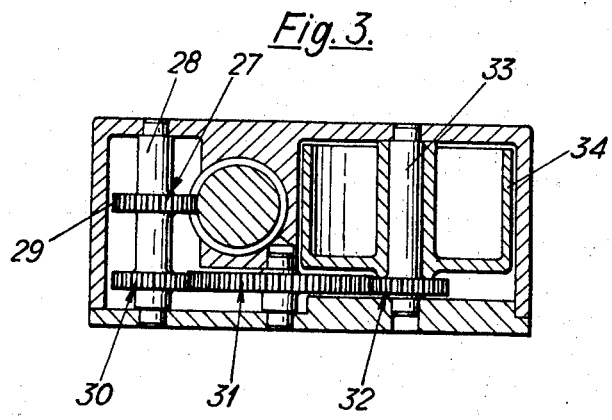
FIGURE 3 is a horizontal section on the line III—III of FIGURE 2.
Figure 2:
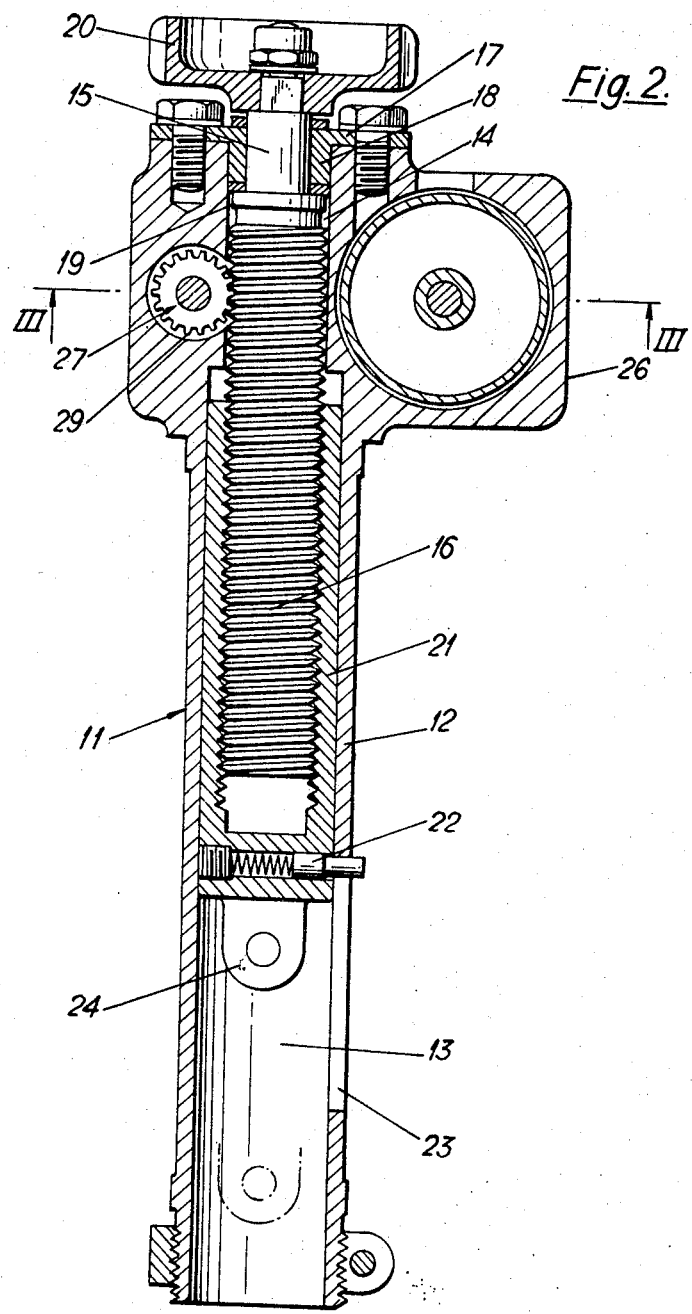
FIGURE 2 is a vertical medial sectional view through the adjusting means of FIGURE 1.

The application of this adjusting means to an ejection seat will also be described.

The ejection seat to which the adjusting means is applied in general terms comprises a seat frame 1 equipped with an ejection gun 2 and a seat pan 3. Beneath the pan 3 of the ejection seat there is a rocket motor pack 4 pivotally supported towards the rear of the pan 3 by shouldered bolts 5 located in appropriate dependent brackets 6 on each side of the seat pan 3. In this embodiment the rocket motor pack 4 comprises a tubular spine 7 that is closed at its ends and which is adapted to be supported at these closed ends by the bolts 5 and brackets 6. The spine has, at spaced intervals therealong, a series of ports 8 which communicate with annular bosses 8 welded or otherwise suitably secured to the spine 7. These bosses 8 are internally screw-threaded to receive complementary screw-threaded heads of canisters 9 containing charges of propellent, these charged canisters each constituting a rocket motor for the pack 4. The spine 7 is also provided with a series of nozzled exhaust ports 10 which have their axes directed generally downwardly and rearwardly from the longitudinal axis of the spine 7, when the pack is orientated so as to be in a substantially horizontal attitude.

It will be appreciated from the description of the pack given above that the canisters 9 extend forwardly of the seat and beneath the pan 3 of the same. The forward end of the pack 4 is supported by a part of adjusting means generally designated 11, one end of adjusting means being secured to the pack 4 and the other end to the pan 3 of the seat.

In this embodiment the adjusting means 11 comprise a tubular body 12 adapted to be secured to the seat pan 3 by welding or any other suitable means. This tubular body 12 has a central bore 13 extending from one end thereof to the other and one end portion 14 of this bore has a slightly reduced internal diameter. Located within the bore 13 of the tubular body 12 is a first member which comprises a rod 15 externally screw-threaded at 16 over substantially its entire length and which has an external diameter slightly less than the internal diameter of such reduced portion 14 of the bore 13 in the tubular body 12.

One end portion of this externally screw-threaded rod 15 is located centrally within the bore 13 of the tubular body 12 by a bearing member comprising an annular ring 17 bolted to the body 12, such ring 17 having a central cylindrical portion 18 which lines a portion of the bore 13 of such body 12. The rod 15 passes through the annular ring 17 which permits rotary movement thereof about its longitudinal axis but prevents longitudinal axial movement of the rod 15 by engaging a shoulder 19 formed on the rod 15. The end portion of the rod 15 located by, and extending through, the annular ring 17 carries a knurled knob 20, this knob 20 being provided to permit an airman in the seat to rotate the externally screw-threaded rod 15.

The end portion of the externally screw-threaded rod 15 remote from the knob 20 and ring 17 is threadedly engaged with an internally screw-threaded tubular second member 21 which is positioned for sliding movement within the wider portion of the bore 13 of said tubular body 12, this second member 21 carrying a spring-loaded detent 22 which extends into a narrow longitudinally-extending slot 23 in the wall of the tubular body, this detent 22 preventing rotational movement of the second member 21 about its longitudinal axis whilst permitting longitudinal axial movement thereof over the entire length of the slot 23.

This second tubular member 21 is provided with a lug 24 which is secured via a connecting element 25 to the rocket motor pack 4.

The arrangement of the adjusting means 11 is such that rotation of the knob 20 in either direction causes the extrenally screw-threaded rod 15 to rotate and, because such rod 15 cannot move axially, the inter-engagement of the thread 16 thereof with the threaded tubular second member 21 results in longitudinal movement of said second member 21 (this second member 21 being prevented from moving rotationally with the screw-threaded rod 15). This axial movement of the second member 21 is transmitted by the connecting element 25 from the lug 25 on the second tubular member 21 to the rocket motor pack 4.

Rotation of the knurled knob 20 in one direction will effectively move the second tubular member 21 away from the knob 20 whereas rotation in the opposite direction will move such second member 21 towards the same. Because of the connection of the adjusting means 11 to the rocket motor pack 4 at a position remote from the pivotal connection of the pack 4 to the seat pan 3, the pack 4 will be moved angularly with respect to the seat pan 3 in response to movement of the second member 21.

Provided in a housing 26 formed integrally with the said body 12 is a pinion 27 carried on a spindle 28 in bearings formed in the housing, such pinion 27 having teeth 29 which mesh with the externally screw-threaded rod 15. The spindle 28 carrying the pinion 27 also carries a gear wheel 30 which meshes with a separately mounted freely rotatable gear wheel 31 of larger diameter which, in turn, meshes with a smaller diametered gear wheel 32 rigid with a separate spindle 33 upon which is positioned a drum, 34, this drum 34 being provided with gradutaions which are significant of airman weight moments about a selected (arbitrary) datum.

It will be appreciated that rotation of the externally screw-threaded rod 15 will result in the rod acting as a worm engaging the pinion 27 so that rotary movement of the rod 15 results in rotary movement of the pinion 27, such rotary movement being transmitted through the three gear wheels 30, 31 and 32 to the spindle 33 carrying the drum 34 which constitutes an indicator, the body surrounding the drum being provided with a window through which graduations on the drum may be viewed. The respective diameters of the pinion 27 and the gear wheels 30, 31 and 32 are chosen so that the extent of rotary movement of the drum 34 is greater than the rotary movement of the pinion 27.

It will be appreciated, therefore, that rotation of the knurled knob 20 results in angular movement of the rocket pack 4 but also results in rotation of the indicator drum 34.

As it is important for the thrust line of the rocket motor pack 4 to pass substantially through the centre of gravity of the seat/airman combination and because airman of differing builds will have centres of gravity in different positions with respect to the seat the position of the centre of gravity of the seat/airman combination will similarly vary in dependence upon the build of the airman seated in the seat. Thus, each airman is provided with his weight moment as computed or, alternatively, measured by the use of a suitable test rig, such a rig being the subject of my British Patent No. 959,900 so that when he uses the ejection seat it is merely necessary for him, after seating himself in the seat, to adjust the knurled knob 20 until the appropriate weight moment on the indicator drum shows through the window in the body 26 of the adjusting means when such adjustment has been made the rocket motor pack will be canted into a position in which the thrust line thereof will pass substantially through the centre of gravity of the seat/airman combination.

I claim:
1. An ejection seat comprising:
   an ejection gun for effecting initial ejection of the seat/airman combination from the aicraft in a predetermined direction relative to the aircraft;
   at least one rocket motor pack positioned beneath the ejection seat;
   means for pivotally securing said pack to said ejection seat to permit angular movement thereof with respect to the seat;
   adjusting means extending between said seat and said pack and being actuable to set the pack into a desired angular position with respect to the seat which is significant of airman weight moments about a selected (arbitrary) datum; and said adjusting means comprising;
   a tubular body;
   a first screw-threaded member rotatable within such body about its longitudinal axis;
   means which prevent longitudinal axial movement of said first member;
   a second tubular member which is screw-threaded and which lies at least partially within said tubular body and which is longitudinally axially movable with respect to such body the screw threaded portion of the first member engaging the screw thread of the second member;
   means which restrain rotational movement of the second member about its longitudinal axis so that rotation of the first member results in axial movement of the second member;
   means for rotating said first member;
   a pinion on said body which is engaged as a worm by a screw thread on the first member;
   an indicator; and
   means for transmitting movement of said pinion in response to rotary movement of the first member to said indicator, the indicator being calibrated with graduations significant of airman weight moments about a selected (arbitrary) datum.

2. An ejection seat according to claim 1, wherein said indicator comprises a rotatable drum.

3. An ejection seat according to claim 1, wherein said means for transmitting movement of the pinion to the indicator comprises a gear assembly arranged to transmit small movement of the pinion as larger movements to the drum.

4. An ejection seat according to claim 1, wherein said body is secured to the ejection seat and the axially movable second member is secured to the rocket motor pack.

5. An ejection seat according to claim 1, wherein said means for rotating said first member comprises a manually operable knob carried rigidly on said first member.

6. An ejection seat according to claim 1, wherein one continuous screw thread is provided on said first member, a portion of this thread engaging the screw thread of the second member and a portion engaging the pinion.

7. For an ejection seat comprising an ejection gun for effecting initial ejection of the seat/airman combination from the aircraft in a predetermined direction relative to the aircraft; at least one rocket motor pack positioned beneath the ejection seat; and means for pivotally securing said pack to said ejection seat to permit angular movement thereof with respect to the seat:
   adjusting means adapted to extend between said seat and said pack and being actuable to set the pack into a desired angular position with respect to the seat which is significant of airman weight moments about a selected (arbitrary) datum; and said adjusting means comprising a tubular body;
   a first screw-threaded member rotatable within such body about its longitudinal axis;
   means which prevent longitudinal axial movement of said first member;
   a second tubular member which is screw-threaded and which lies at least partially within said tubular body and which is longitudinally axially movable with respect to such body the screw-threaded portion of the first member engaging the screw thread of the second member;
   means which restrain rotational movement of the second member about its longitudinal axis so that rotation of the first member results in axial movement of the second member;
   means for rotating said first member;
   a pinion on said body which is engaged as a worm by a screw thread on the first member;
   and indicator; and
   means for transmitting movement of said pinion in response to rotary movement of the first member to said indicator, the indicator being calibrated with graduations significant of airman weight moments about a selected (arbitrary) datum.

References Cited

UNITED STATES PATENTS

| 3,124,324 | 3/1964 | Martin | 244—122 |
| 3,190,589 | 6/1965 | Mennborg | 244—122 |

MILTON BUCHLER, Primary Examiner.
RICHARD A. DORNON, Assistant Examiner.

U.S. Cl. X.R.
116—124.